Feb. 26, 1952 L. DORBEC 2,587,294

DEVICE FOR STABILIZING OSCILLATIONS

Filed May 21, 1946

Inventor
L. Dorbec
By Glascock Downing Seebold Attys.

Patented Feb. 26, 1952

2,587,294

UNITED STATES PATENT OFFICE 2,587,294

DEVICE FOR STABILIZING OSCILLATIONS

Lucien Dorbec, Paris, France, assignor to Societe Anonyme de Telecommunications, Paris, France, a body corporate of France Application May 21, 1946, Serial No. 671,186
In France December 16, 1942

Section 1, Public Law 690, August 8, 1946
Patent expires December 16, 1962

6 Claims. (Cl. 250—36)

The present invention pertains to a device for the stabilization of oscillators, and its object is more particularly an oscillator having great stability of operation over a wide scale of frequencies, whilst giving rise to a relatively small production of harmonics. Different means have already been proposed for increasing the stability of an oscillator and reducing the production of harmonics; it is known, for example, to limit the alternating voltage, instead of using the bends of the characteristic curve of the oscillating tube, by means of an element associated with the oscillating circuit and acting as a variable resistance, for example dry rectifiers, tungsten or carbon filament lamps, a saturated iron core or a similar device. In this case, the oscillator as a whole may be considered as an amplifier operating in the rectilinear and consequently very stable portion of its characteristic curve, which amplifier is associated with an oscillating circuit provided with a voltage limiting device. Another known means for rendering stable an oscillator and for reducing the proportion of harmonics consists in making use of a negative feed back circuit. However, whatever be the device used, the reactance coils of the oscillating circuit unavoidably have losses varying with the frequency and due in particular to the resistance proper of the coils: for example, a coil of good quality and having low losses in one part of the frequency range used, may exhibit, on the contrary, important losses in another part of said range. The result is that in spite of the aforementioned improvements, the operation of the oscillator cannot remain constant, with respect to the stability and the production of harmonics, when the tuning capacity connected to the terminals of the coil varies within wide limits.

The device forming the object of the present invention is applicable to oscillators having a negative feed back circuit, and its object is to correct oscillating circuits in such a manner that the operation of the oscillator, as well as its qualities are not dependent on the value of the tuning capacity of the said oscillating circuit; this device is characterised by the fact that it consists of a negative feed back circuit associated with the oscillating circuit and composed of elements so combined that its impedance increases with the frequency.

The result obtained is all the better as this impedance is less reactive. For example, a circuit which is particularly adapted to the desired purpose is constituted by a reactance coil having high losses which increase with the frequency, or by a simple reactance coil associated, if necessary, with a resistance, or again, by a network comprising reactance coils, capacities and resistances. By means of this device, the influence of the negative feed back increases rapidly with an increase in the frequency, so that the capacity of the oscillator is improved and the proportion of harmonics is reduced.

By way of example, several embodiments of the device forming the object of the invention are hereinafter described and illustrated in the accompanying drawing.

Figures 1, 2, 3, 4, 5, 6, 7, 8, 9, 10:
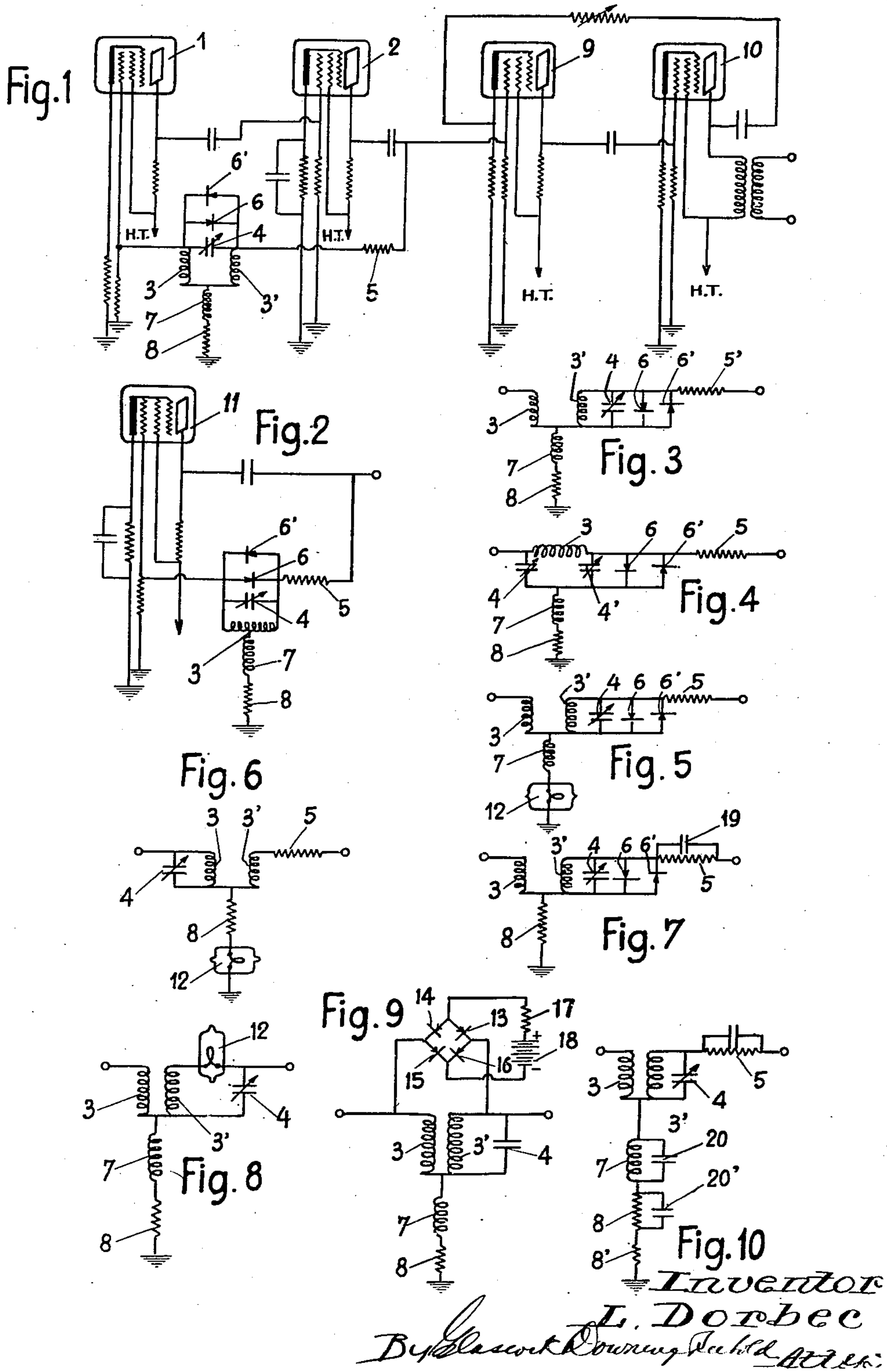
Figure 1 is a diagram showing a two-tube oscillator provided with a negative feed back circuit and followed by a power amplifier.
Fig. 2 shows a one-tube negative feed back oscillator circuit.
Figs. 3 to 10 show various types of oscillating circuits provided with the improvements according to the invention.

In Fig. 1, the oscillator comprises two tubes 1 and 2 and an oscillating circuit comprising reactance coils 3, 3' and a tuning capacity 4 and mounted between the anode circuit of the tube 2 and the cathode circuit of the tube 1, so as to produce a positive reaction. A decoupling resistance 5 is mounted on the connection lead, whilst the two rectifying copper oxide elements 6, 6' are mounted in parallel, but in the reverse direction one in relation to the other, on the terminals of the tuning capacity 4, so as to limit the voltage produced in the oscillating circuit 3—4. In accordance with the invention, a negative feed back circuit constituted by a reactance coil 7 and a resistance 8 and having an impedance increasing with the frequency, is added to the oscillating circuit 3—4. A power amplifier comprising the tubes 9—10 is mounted after the oscillator 1, 2 so as to eliminate all influence on the frequency of the load impedance which is assumed to be able to vary between a few ohms and several thousand ohms. An oscillator so constituted is extremely stable; its stability only depends on the constancy of the oscillating circuits, which is of the order of $1/10^5$, and it is furthermore poor in harmonics the proportion of which is from 2 to 3 $x1/10^3$. The voltage remains constant, with an approximation of a fraction of a decibel, whatever be the frequency, the load impedance and the supply voltages. This device enables a band of frequencies from 30 to 300,000 periods per second to be obtained, distributed over 10 bands, so as to provide a sufficient accuracy of adjustment.

Fig. 2 illustrates the use of the device with a one-tube oscillator embodying the same circuit in accordance with the invention, comprising, between the output and input circuits of the tube 11, an oscillating circuit 3—4 provided with a voltage limiting device 6, 6' and the negative feed back circuit 7, 8

Fig. 3 is a diagram of the feed back circuit, in which it is possible to alter the sequence and the arrangement of the various elements according as the oscillating circuit is constituted by a Hartley, Colpitts or similar circuit, as in Fig. 4. The non linear voltage limiting element 6, 6' may be placed in various points of the circuit, which are determined according as this element has a resistance which increases or decreases with the current flowing therethrough. For example a copper oxide element 6, 6', having a decreasing resistance, is placed in shunt on the circuit as in Figures 3, 4, 5 and 7, whilst a tungsten filament lamp 12, having an increasing resistance, is placed in series in one of the branches 3, 3' as shown in Figs. 5, 6, 8. These elements may moreover be used simultaneously, as in Fig. 5. An alternative embodiment is shown in Fig. 9 wherein a bridge formed of copper oxide elements 13, 14, 15, 16 is used with a resistance 17 to which may be added a biassing voltage represented by the battery 18. Likewise, the correcting device may be placed in various points of the circuit, as shown in Figs. 3, 4, 5 or 6, where the correcting parts are directly placed on the negative feed back element, or as in Fig. 7, where this part, which is constituted by the capacity 19, forms part of the decoupling circuit. Fig. 10 shows a complex circuit composed of a reactance coil 7, capacities 20, 20' and resistance 8, 8' so as to extend still more the width of the transmission band or eliminate certain harmonic frequencies.

What I claim is:

1. A vacuum tube oscillation generator, comprising a tube having at least anode, control grid and cathode elements, an oscillatory circuit external to said tube comprising an inductance and an adjustable capacitance in parallel and connected between the anode and the control grid of the tube, means connected with said oscillating circuit for limiting the amplitude of oscillation, and a negative feed back circuit comprising an element whose impedance increases with frequency, said negative feed back circuit being connected between a point of the inductance in the oscillatory circuit and the cathode of the tube.

2. A vacuum tube oscillation generator, comprising a tube having at least anode, control grid and cathode elements, an oscillatory circuit external to said tube comprising an inductance and an adjustable capacitance in parallel and connected between the anode and the control grid of the tube, means connected with said oscillating circuit for limiting the amplitude of oscillation, and a negative feed back circuit comprising a slightly inductive element, said negative feed back circuit being connected between a point of the inductance in the oscillatory circuit and the cathode of the tube.

3. A vacuum tube oscillation generator, comprising a tube having at least anode, control grid and cathode elements, an oscillatory circuit external to said tube comprising an inductance and an adjustable capacitance in parallel and connected between the anode and the control grid of the tubes, means connected with said oscillating circuit for limiting the amplitude of oscillation, and a negative feed back circuit comprising a reactance coil in series with a resistance, said negative feed back circuit being connected between a point of the inductance in the oscillatory circuit and the cathode of the tube.

4. A vacuum tube oscillation generator, comprising a tube having at least anode, control grid and cathode elements, an oscillatory circuit external to said tube comprising an inductance and an adjustable capacitance in parallel and connected between the anode and the control grid of the tube, means connected with said oscillating circuit for limiting the amplitude of oscillation, and a negative feed back circuit comprising a reactance coil having high losses increasing with the frequency said negative feed back circuit being connected between a point of the inductance in the oscillatory circuit and the cathode of the tube.

5. A vacuum tube oscillation generator, comprising a tube having at least anode, a control grid and cathode elements, an oscillatory circuit external to said tube comprising an inductance and an adjustable capacitance in parallel and connected between the anode and the control grid of the tube, a voltage limiting means comprising copper oxide rectifiers connected in parallel with said oscillatory circuit for stabilizing the amplitude of oscillation, and a negative feed back circuit comprising an element whose impedance increases with frequency, said negative feed back circuit being connected between a point of the inductance in the oscillatory circuit and the cathode of the tube.

6. A vacuum tube oscillation generator, comprising a tube having at least anode, control grid and cathode elements, an oscillatory circuit external to said tube comprising an inductance and an adjustable capacitance in parallel, and connected between the anode and the control grid of the tube, a voltage limiting means comprising a tungsten filament lamp connected in series with said oscillatory circuit for stabilizing the amplitude of oscillation, and a negative feed back circuit comprising an element whose impedance increases with frequency, said negative feed back circuit being connected between a point of the inductance in the oscillatory circuit and the cathode of the tube.

LUCIEN DORBEC.

REFERENCES CITED

The following references are of record in the file of this patent:

UNITED STATES PATENTS

| Number | Name | Date |
|---|---|---|
| 1,568,891 | Espenschied | June 5, 1926 |
| 2,101,563 | Rocard | Dec. 7, 1937 |
| 2,163,403 | Meacham | June 20, 1939 |
| 2,173,427 | Scott | Sept. 19, 1939 |
| 2,268,872 | Hewlett | Jan. 6, 1942 |
| 2,303,485 | Meacham | Dec. 1, 1942 |
| 2,340,429 | Rankin | Feb. 1, 1944 |
| 2,482,493 | King | Sept. 20, 1949 |

FOREIGN PATENTS

| Number | Country | Date |
|---|---|---|
| 90,263 | Sweden | Sept. 21, 1937 |